(12) United States Patent
Riebel et al.

(10) Patent No.: US 10,343,368 B2
(45) Date of Patent: *Jul. 9, 2019

(54) MULTI-LAYER ADDITIVE TEXTURE LAMINATES AND METHODS

(71) Applicant: WILSONART LLC, Austin, TX (US)

(72) Inventors: Michael Riebel, Mankato, MN (US); Milton Riebel, Mankato, MN (US)

(73) Assignee: Wilsonart LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/821,005

(22) Filed: Nov. 22, 2017

(65) Prior Publication Data

US 2018/0093442 A1    Apr. 5, 2018

Related U.S. Application Data

(63) Continuation of application No. 14/955,631, filed on Dec. 1, 2015, now Pat. No. 9,855,718, which is a continuation of application No. 14/215,595, filed on Mar. 17, 2014, now Pat. No. 9,199,428.

(60) Provisional application No. 61/952,977, filed on Mar. 14, 2014, provisional application No. 61/799,079, filed on Mar. 15, 2013.

(51) Int. Cl.
*B32B 3/02* (2006.01)
*B32B 3/10* (2006.01)
*B32B 38/00* (2006.01)
*B41M 3/00* (2006.01)
*B41M 3/06* (2006.01)

(52) U.S. Cl.
CPC .............. *B32B 3/10* (2013.01); *B32B 38/145* (2013.01); *B41M 3/008* (2013.01); *B41M 3/06* (2013.01); *Y10T 428/24851* (2015.01)

(58) Field of Classification Search
CPC ................................ B32B 3/10; B32B 38/145
See application file for complete search history.

(56) References Cited

U.S. PATENT DOCUMENTS

| 3,418,189 | A | 12/1968 | Grosheim |
| 3,700,537 | A | 10/1972 | Scher |
| 5,047,282 | A | 9/1991 | Mier |
| 5,296,340 | A | 3/1994 | Tsukada et al. |
| 7,090,910 | B2 | 8/2006 | Courtoy et al. |
| 2003/0116261 | A1 | 6/2003 | O'Brien et al. |
| 2004/0029030 | A1 | 2/2004 | Murray |

(Continued)

FOREIGN PATENT DOCUMENTS

| EP | 2042332 | 4/2009 |
| EP | 2412516 | 2/2012 |

(Continued)

OTHER PUBLICATIONS

Jordan, Hannah, "Drytac Europe expands laminate range for UV-curable print", Print Week, Jul. 16, 2013, accessed on the Internet Jul. 9, 2014 URL: <https://www.printweek.com/p.

*Primary Examiner* — Elizabeth E Mulvaney
(74) *Attorney, Agent, or Firm* — Welsh Flaxman & Gitler LLC (57) ABSTRACT

A multi-layer laminate may include a substrate, a printed build layer adjacent the substrate and defining a texture having elevated areas and areas of relief, a printed image layer adjacent the build layer, and a coating layer having a mineral loading and a method for creating a textured laminate may include steps to cause the printed image to be in registration with the texture.

5 Claims, 5 Drawing Sheets

(56) References Cited

U.S. PATENT DOCUMENTS

| | | |
|---|---|---|
| 2004/0086678 A1 | 5/2004 | Chen et al. |
| 2004/0256754 A1 | 12/2004 | Koguchi |
| 2006/0156672 A1 | 7/2006 | Laurent et al. |
| 2007/0283648 A1 | 12/2007 | Chen |
| 2011/0177303 A1 | 7/2011 | Suehiro et al. |
| 2011/0268900 A1 | 11/2011 | Lin et al. |
| 2013/0251922 A1 | 9/2013 | Colella et al. |
| 2014/0037917 A1 | 2/2014 | Branch et al. |
| 2014/0272296 A1 | 9/2014 | Fahlsing et al. |

FOREIGN PATENT DOCUMENTS

| | | |
|---|---|---|
| WO | WO9624490 | 8/1996 |
| WO | WO2011103641 | 9/2011 |
| WO | WO2012009528 | 1/2012 |

MULTI-LAYER ADDITIVE TEXTURE LAMINATES AND METHODS

CROSS-REFERENCE TO RELATED APPLICATIONS

This application claims priority to U.S. provisional patent application No. 61/799,079 filed on Mar. 15, 2013, entitled "Multi-layer Additive Texture UV Print Surface Decorative Laminate and Method of Making Same" and U.S. Provisional patent application No. 61/952,977 filed on Mar. 14, 2014, entitled "A multi-layer, additive texture, 3D Printed Decorative Laminate and Method of Making," the disclosure of each of which is hereby incorporated by reference herein it their entireties.

FIELD OF THE INVENTION

The present disclosure relates to textured images. Particularly, the present disclosure relates to creating multilayer additive texture surfaces and coating that may be generally aligned with an image.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Laminates may generally be considered an alternative to traditional building and finishing materials, such as stone, wood, granite, or brick. Various methods exist to produce laminates that imitate traditional building materials such as high pressure laminates (HPLs) and low pressure laminates (LPLs). A persistent problem is the resulting laminates may not possess the realistic look and texture of the traditional building and finishing materials. One problem that leads to a non-realistic look is that a true high definition image is extremely difficult to produce. Conventional laminate methods have only one layer of thin water based ink in its print paper layer. The ink layer may bleed, be easily worn through, or may crack. UV printing, commonly used in the signage industry, is capable of creating a high definition image. However, typical UV inks used in digital printing have been hard and brittle, thus limiting a digitally printed product's ability for thermofoiling. In addition, UV cured inks traditionally had very limited stretch, less than 250% for the most flexible inks. Membrane pressing of a printed thermofoil requires a minimum ink stretch greater than 250% otherwise the ink will crack in the thermofoiling process, especially on the edge where stretch can be greater than 500%. Conventional laminates typically use a protective melamine saturated paper overlay. Although the paper becomes relatively clear when placed under high heat and pressure, it can have a milky appearance and different refractive indexes that may further contribute to a fake look.

While some other high quality laminate boards may tend to visually look like their intended natural counterpart, the laminate texture readily reveals that they are fake. Typical texturized synthetic laminates have random textures. These random textures may not align with the printed image. For example, laminate given a wood like texture may have a visual depiction of a wood knot. The wood like texture over the image of the wood knot however, does not match the surface texture characteristic of a wood knot. One prior approach shows a method of forming a textured surface on alternative materials by mechanical embossing. However, the process of accurately registering an embossment (forming a press plate) that matches the desired texture of the laminate image has proven extremely difficult. Furthermore, even if an embossment is accurately registered, it has been difficult to accurately maintain the alignment of the registered embossment and the laminate image in order to emboss with near perfect alignment. Even if an embossment could be registered to match the desired texture and easily aligned with the image, mechanical embossing is limited in the depth (0.012 inches) of the texture on the laminate due to cracking of the surface during processing. Some HPLs may be produced with an overall greater thickness to avoid problems with cracking, however, the greater thickness detracts from the laminate's post-formability. It is often not possible to post-form these laminates to the relatively tight radii of conventional kitchen countertop profiles or other demanding post-forming applications.

In addition, conventional laminate processes use formaldehyde, which has been classified as a known human carcinogen by the International Agency for Research on Cancer and as a probable human carcinogen by the U.S. Environmental Protection Agency.

Thus, there is a need in the art for a workable method of fabricating alternative building or finishing materials, without formaldehyde, where the alternatives have the realistic look and feel of traditional products. More particularly, there is a need for a true high definition laminate, that is generally or substantially perfectly aligned with a texture that matches the image, and has high clarity and differential gloss levels.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one embodiment, relates to a method for producing a multi-layer additive texture high definition image. The method comprising constructing a build layer. The build layer comprising one or more build levels, each of the build levels comprising a surface of one or more heights. The heights being varied and corresponding to an image property in an image. The layering of each build level resulting in a three dimensional textured surface. The method further including printing an image layer comprising a copy of the image onto the build layer.

The present disclosure, in another embodiment, relates to a computer implemented method for creating a high definition textured laminate. The method comprising receiving a laminate image and assigning a build value to each of the one or more image properties in the laminate image. The build values comprising a texture specific to the laminate image. The method also including printing one or more build levels onto a sheet of a core substrate to create a build layer, each build level having one or more heights. Each height registering a difference in one of the one or more image properties. The method involving printing the laminate image onto the build layer such that it substantially aligns to the texture.

The present disclosure, in another embodiment, relates to a multi-layer laminate. The laminate comprising a substrate.

The laminate comprising a printed build layer adjacent the substrate and defining a texture having elevated areas and areas of relief. The laminate comprising a printed image layer adjacent the build layer. The laminate comprising a coating layer having a mineral loading.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure relates to novel and advantageous methods to create surfaces that replicate natural surfaces in appearance and texture. Particularly, the present disclosure relates to novel and advantageous methods to produce multilayered laminate with three dimensional textures and coating that may be generally aligned with a high definition image. The present disclosure may be used to make a laminate surface having a substantially realistic look and texture to a natural building material and may be the general embodiment presented herein. It is understood that any number of products with a three dimensional texture generally aligning to match that of a selected image may be created.

Figure 1:
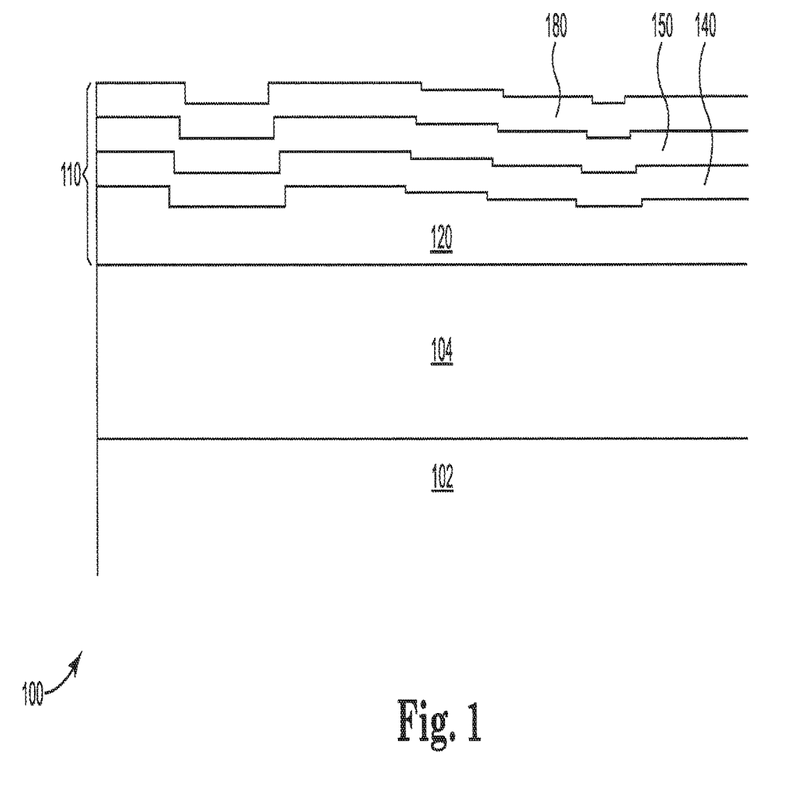
FIG. 1 is a profile sketch of a multi-layer, textured laminate.
Figure 2:
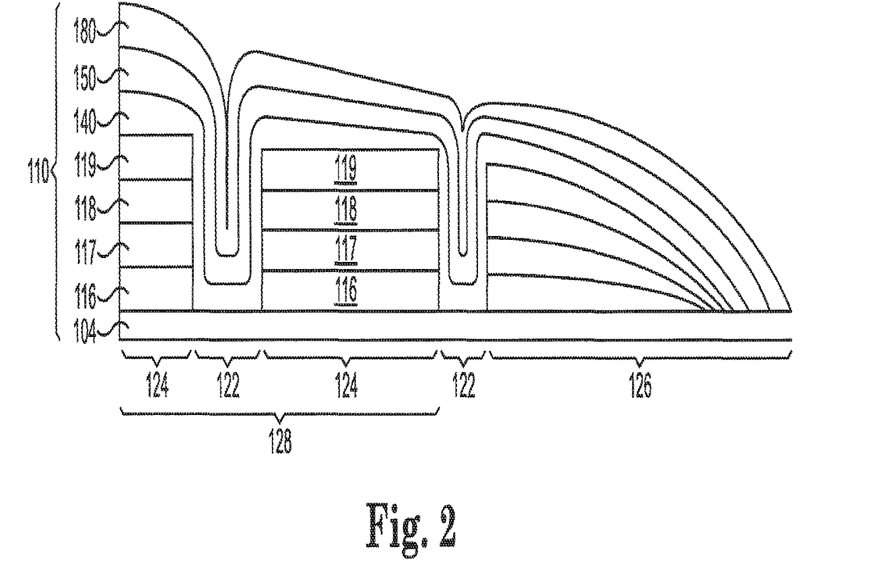
FIG. 2 is a profile sketch of a multi-layer texture print.

A laminate may consist generally of various layers that have been cured under heat and pressure to fuse and bond together. For example, FIG. 1 shows a laminate 100, the various layers comprising a composite 102, a core substrate 104, a build layer 120, a mask layer 140, a laminate image layer 150, and a clear coating layer 180. A multi-texture print 110 may comprise the build layer 120, mask layer 140, and laminate image layer 150. A composite 102 may be any suitable hard surface to affix a laminate. A core substrate 104 may be a laminate surface on which to print the MTP 110. The build layer 120 may be comprised of one or more build levels, that when layered create a specific texture, as seen in FIG. 2. The specific texture may relate, by height, to one or more colors present in a laminate image. The mask layer 140 may provide a suitable flood to print the laminate image. The laminate image layer 150 may be comprised of a selected image, the same image used to create the specific texture. The image may typically be, but is not limited to, stone, wood, or other natural materials.

A particularly advantageous aspect of the present disclosure, is an additive texture process which may create the three dimensional textured laminate surface. The additive texture process is advantageous in that it may make a three dimensional texture of virtually any shape from a digital multilayer model or computer design. In some embodiments, a build layer may be specifically designed to texture map a selected image, highlighting the various color tones within an image. Referencing FIG. 2, a MTP 110 may be specifically designed to texture map the various color tones 190, 192, and 194 within an image 188. For example, darker areas 190 may be assigned a thicker texture layer 124 but lighter colors 190 may be assigned a texture that has little to no thickness 122. Colors that have a plurality of shades 194 may be assigned a gradient texture 126. The selected image texture may be produced using an additive process, where successive layers of material may be laid down in different shapes. The multilayer texture print 110, may be printed onto a core substrate 104, which may be constructed into printable sheets. The texture may be built by layering build level 116, using an ink, onto the core substrate 104. Build levels 117, 118, and 119 may be layered onto build level 116. Each build level may be similar for a uniform build area 124 or different to provide a multilevel build area 128 or gradient build area 126. The printing of one or more build levels on top of each other may create a build layer (comprising build levels 116-119) having a texture that corresponds with the colors 190-194 of the selected image 188. A mask layer 140, or flood coat, may be applied to a completed build layer, in some embodiments. The specific image, herein called the laminate image layer 150 may be printed on the mask layer 140. The laminate image layer 150 may be printed so that it may align with the textured build layer. The laminate image layer 150 may comprise of a copy of the image 188. The image 188 may be in the original color format. In addition, embodiments of the present disclosure may include the printing of a coating or gloss layer 180. All the layers described thus far may be cured using heat and or pressure, resulting in a laminate 100. The laminate 100 may be affixed to a composite by any suitable method.

The Multi-Layer Textured Laminate Image

The Composite Substrate

The composite substrate, or composite, may be a low-weight, high rigidity material. Referring to the exploded FIG. 4, one surface 101 of the core substrate 102 may be affixed to a surface 103 of the composite 104. In various embodiments, the core substrate 104 may be affixed 108 to the composite 102 by water based wood glues, urethane glues, or any other glue or suitable method. Any suitable method to affix the core substrate and the composite may be used. The composite may be a wood particle board, thick wood, agrifiber, or any other suitable material.

The Core Substrate

A core substrate, or core, may be a thinner laminate which the MTP layer may cure or fuse to, in various embodiments. The core substrate may be a sheet, which may be fed into a printer. Typically these core substrates are under 0.26 inches in thickness. For example, according to the NEMA/ANSI LD3 standards for high pressure laminates (HPLs), a laminate may be between 0.02 inches and 0.118 inches. In some embodiments, the core substrates may be preferably under 0.06 inches in thickness. It is understood that a core substrate of any thickness may be used. One or more cores may be used in conjunction with embodiments of the present disclosure.

Figure 4:
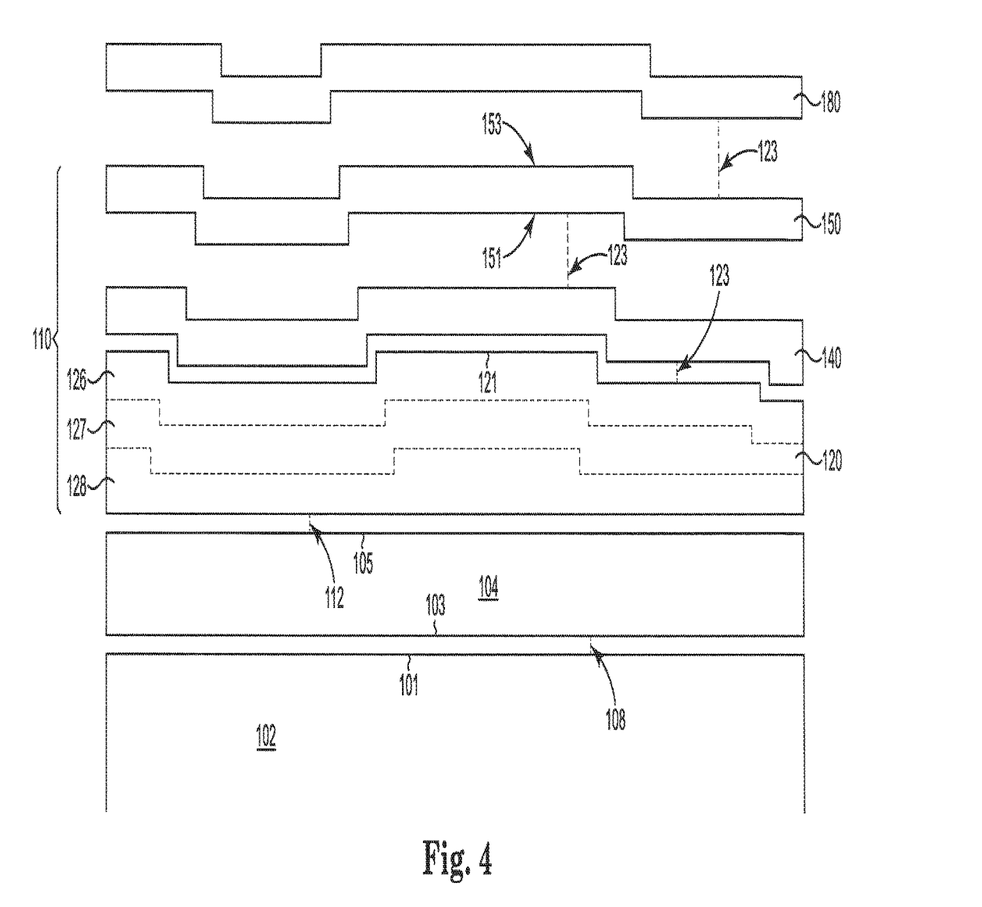
FIG. 4 is an exploded profile sketch of a multi-layer, textured laminate.

Referring to FIG. 4, the core substrate 104 may be situated between the composite 102 and the MTP 110. The MTP 110 may be printed 112 directly onto a printable surface 105 of the core substrate 104. Another surface, the composite side surface 103, of the core substrate 104 may be glued or affixed to the composite 102. In various embodiments, the composite side surface 103 and printable surface 105 of the core substrate 104 may be directly opposite each other. The composite side surface 103 may also be used for balance construction, which may protect the particleboard composite 102 from moisture.

A core substrate may be prepared, or made, from one or more core substrate materials. The core substrate may contain one or more components that may result in different laminate properties. The core substrate components may include, but are not limited to: backers (to prevent warping), grades (to prevent wear impact and stains), formable plastic (allowing the laminate to be heat formed or thermoformed around a composite), and metal foil (to provide a highly reflective surface). In various embodiments, the core substrate may be comprised, in part, of fillers and/or additives. Any substrate that may be used as a decorative laminate may be used with embodiments of the present disclosure.

Core Substrate Materials

Embodiments of the present disclosure may use a range of core substrates from standard HPL/LPL sheets, thermoplastic laminates, thermoplastic sheets with non-woven backers, mineral/fiber filled thermoplastic sheets, thin wood composites, and other core substrates that have additional functionality. Some embodiments may use a conventional HPL core substrate comprising of multiple layers of saturated kraft papers that are fused under high heat and high pressures. The substrates may be a standard white in some embodiments, or may be colored in other embodiments. The HPLs may be in various grades from standard vertical or horizontal grades, door skin grades, post formable, fire rated, compact laminate grades and any other suitable grades.

Core substrates may be comprised of thermoplastic sheets. Conventionally, thermoplastic sheets may not have had sufficient heat resistance for HPL applications, however, the integration of thermoset UV cured ink and coating surface layers, in the present disclosure, may protect the overall decorative laminate from heat distortion. In various embodiments, thermoplastic substrates may include, but are not limited to, PET, polyethylene, polypropylene, acrylic, polystyrene, EVA, polycarbonate, PEEK, ABS, polycarbonate, any other suitable material, and any combination thereof. The thermoplastic sheets may be extruded into a thin sheet. In some embodiments, the sheet may range in thickness between 0.005 inches and 0.125 inches. In other embodiments, the sheet thickness may be less than 0.005 inches or greater than 0.125 inches.

Embodiments of the present disclosure may also include the use of formaldehyde free substrates. Examples of formaldehyde free substrates may include, but are not limited to, various thermoplastic sheets. In one embodiment, a thermoplastic sheet that integrates a fused non-woven backer sheet may be used, thus allowing for water based laminating adhesion during the decorative laminate gluing process onto a wide range of thick non-plastic composite substrates. Formaldehyde free thermoplastic sheets may be made from bio-plastics that include, but are not limited to, polylactic acid, PHA, and blends of bio-plastic with petroleum plastics to create alloys. Bio-plastic sheets may also be filled with various minerals or fillers to improve heat resistance of the final three dimensional printed laminate. In various embodiments, the bio-plastic sheets may be filled at preferred levels, greater than 50%. In other embodiments, bio-plastic sheets may be filled at greater than 30%. In still other embodiments, bio-plastic sheets may be filled at greater than 10%. It is understood that any suitable mineral or filler percentage of fill may be used. Bio-plastic laminate core substrates may also integrate a non-woven fiber backer sheet to promote adhesion.

In other embodiments, the cores may comprise a formable plastic and urethane resin backer layer, wherein the urethane resin may allow the formable plastic to be directly adhered to a wood composite shaped article. In some embodiments, plastics such as PLA, PET, PVC, acrylic, ABS, polypropylene, and wood plastic composites and blends thereof may work, but a surface treatment (discussed below) may provide better ink adhesion of the multiple layers of ink. Typically formable sheets have a width in the range of about 0.010" to over about 0.250" and more preferably from about 0.015 to about 0.030". Though it will be appreciated that other thicknesses are also possible and within the scope of the present disclosure. A formable plastic substrate may be heat-formed or thermoformed over a shaped wood composite wherein the urethane layer may provide sufficient adhesion to the wood substrate. Heat formable plastic sheets may have sufficient thickness, such that the sheet, MTP, and coating layer may be sufficient for applications such as countertops and tables.

Backers

In some embodiments, the laminate may comprise non-woven water absorbable backer sheets that are fused to the bottom of the thermoplastic sheet, allowing for laminating using water based adhesives. In one embodiment, a water based adhesive may be PVA. In other embodiments, other water based adhesives may be used. In order to allow for water based adhesives to be used in laminating onto wood composites, a non-woven backer may be water absorbent, in some embodiments. In other embodiments, a non-woven backer that provides sufficient mechanical bonding sites may allow for the use of water based adhesives. Any suitable method that allows for the use of water based adhesives may be used. Non-woven backers may be fused onto the thermoplastic sheets by means of a glue line using standard laminating processes or fused during the thermoplastic extrusion process when the thermoplastic is still in a melt state. In various embodiments, the final thickness of the thermoplastic sheet comprising an addition non-woven backer may range from 0.01 inches to 0.15 inches. In other embodiments, the final thickness may be less than 0.01 inches or greater than 0.15 inches.

A particularly advantageous embodiment of the present disclosure may use mineral and fiber filled thermoplastic sheets comprising of a non-woven fiber backer to provide a formaldehyde free alternative. A formaldehyde free thermoplastic sheet in combination with a three dimensional printing and mineral resin clear coating, that may also be VOC free, may result in a high performance and environmentally friendly embodiment.

In various embodiments, non-woven backers may provide the appropriate performance for the final product at a low cost. It is understood that in other embodiments, woven backers may be used in the present disclosure. It is further understood that any suitable backer may be used in various embodiments of the present disclosure.

A paper or saturated paper backer may be fused to the back of the bioplastic film or sheet so that the back of the multilayer laminate may be adhered to a composite substrate. The adhesion may typically be done using a water based laminating glue using similar methods of laminate to common high pressure laminates. However, any suitable method of adhesion may be used.

Fillers

In various embodiments, the core substrates may comprise various fillers including, but not limited to, fibers, minerals, recycled papers, paper mill waste, additives and fillers. In some embodiments, minerals may include, but are not limited to, calcium carbonate, talc, Tio2, alumina tyhydrate, clay, and other suitable minerals. In various embodiments, fibers may include, but are not limited to, cellulosic, cotton, mineral wool, fiberglass, wood fiber, paper, recycled paper, mill waste, plastic fiber, bio-plastic fiber, and other suitable fiber forms.

The Multi-Layer Texture Print

The multilayer texture print (MTP) is a textured three dimensional image. A specific texture is created and built to match one or more color properties in the image, and the image is substantially perfectly aligned with the created texture. The MTP is printed on a surface of the core substrate. The MTP 110 is comprised of one or more layers. In one embodiment, the layers may include, but are not limited to, a build layer 120, a mask layer 140, and a laminate image layer 150.

The Build Layer

The build layer comprises a specific three dimensional texture for any image. The specific texture is based on one or more properties of the image. In various embodiments, the property may be color. A texture based on color may generate a unique texture height for each individual color. The build layer may be comprised of one or more build levels. In various embodiments, each build level represents a thickness of approximately 0.001 inches to 0.004 inches. In other embodiments, each build level thickness may be less than 0.001 inches, between 0.001 inches and 0.004 inches, or greater than 0.004 inches. In some embodiments, the thickness may vary throughout each build level. The one or more build levels on top of each other may create a build layer 120. For example, building 10 build levels may represent a build layer approximately 0.01 inches to 0.04 inches thick. Other embodiments may have greater or lesser thicknesses in each build level. The resulting build layer thickness may vary within a single sheet and based on the laminate image, may range from approximately 0.002 inches, (two build levels at 0.001 inches each) to over 0.25 inches (two hundred and fifty build levels at 0.001 inches each). Any build level thickness and any number of build levels may be used resulting in any range of thickness.

Referring to FIG. 4, the build layer 120 may be situated adjacent to the core substrate 104. In various embodiments, the build layer 120 may be printed 112 onto the printable surface 105 of the core substrate 104. The build layer may be comprised of one or more build levels 126, 127, and 128. The build levels 126, 127, 128 may be cured, or partially cured, by heat, pressure, or any other suitable means, or a combination thereof. The build layer 120 may be cured to the core substrate 104 by heat, pressure, other suitable means, or a combination thereof. In at least one embodiment, the build levels 126, 127, 128, and the core substrate may be cured at the same time. In other embodiments, they may be cured in any order. A build layer 120 may have a surface that does not run adjacent to the core substrate, herein referred to as the non-substrate surface 121. In at least one embodiment, a mask layer 140 may be situated adjacent to the non-substrate surface 121 of the build layer 120. In some embodiments, there may be no mask layer. In at least one embodiment, a laminate image layer 150 may be situated adjacent to the non-substrate surface 121 of the build layer 120.

In some embodiments, the build levels may be created with ink. In various embodiments, a UV ink may be used. In a preferred embodiment, a black UV ink may be used. UV cured inks with flexibility and stretch may provide desired interlayer adhesion. UV ink with sufficient flexibility and stretch may also better allow for a rigid overprinted HPL and substantially perfect matching of image characteristics on thermoplastic formable laminates. In some embodiments, a UV ink with flexibility and stretch greater than 200% may be sufficient. In some embodiments, a flexibility and stretch greater than 250% may be sufficient. In one embodiment, flexibility and stretch greater than 500% may be preferred. It is understood that a UV ink with any sufficient degree of flexibility and stretch may be used. However, any suitable material may be used to create a build level.

The Mask Layer

The mask layer 140 may cover the build layer, creating a uniform or solid surface on which to print the laminate image. The mask layer may provide an additional texture surface, which may provide aesthetic value and better highlight the texture surface created by the build layer. In a preferred embodiment, the mask may be a solid white flood coat mask layer. However, it is understood that any image, any solid ink or paint color, or any other suitable material may be selected.

Referring to FIG. 4, the mask layer 140 may be situated directly adjacent to the build layer 120, in some embodiments. The mask layer 140 may be affixed 123 to the non-substrate surface 121 of the build layer 120. The mask layer 140 may be situated between the build layer 120 and the laminate image layer 150, in some embodiments. In at least one embodiment, the mask layer may not exist.

Any suitable coating that maintains the texture of the build layers may be used to create a mask layer, or flood coat. In one embodiment, it may be a UV ink similar to that described in the build layer. In various embodiments, it may be a white paint or white ink. In other embodiments, a metallic paint, color paint, or color ink may be used as a flood to provide a novel decorative surface color or reflectance underneath the final color print layer, or laminate image layer. Any suitable material to create a mask may be used and applied.

The Laminate Image Layer

The laminate image layer may display the desired decorative image, or laminate image. The laminate image layer may be substantially perfectly aligned with the build layers created from the same image, thus the color image perfectly matches the three dimensional texture. In at least one embodiment, the laminate image layer comprises a high definition image. The image depth may range from 0.001 inches to 0.01 inches, in some horizontal embodiments. In other horizontal embodiments, the image depth may be less or may be more. In some vertical applications, the image depth may be over 0.01 inches. In other vertical applications, the image depth may be 0.01 inches or less.

Referring to FIG. 4, the laminate image layer 150 may have an image surface 153, which may display the image, and a non-image surface 151, which may be affixed 123 to one other layer of the MTP 110, typically by curing. The non-image surface 151 of the laminate image layer 150 may be adjacent to the mask layer 140, in some embodiments. The non-image surface 151 of the laminate image layer 150 may be affixed 123 to the mask layer by curing or any other suitable means. In other embodiments, the non-image surface 151 of the laminate image may be directly adjacent to the build layer 120. The non-image surface 151 of the laminate image layer 150 may be cured to the non-substrate surface 121 of the build layer 120. In some embodiments, the image surface 153 of the laminate image layer 150 may be adjacent to a clear coating layer 180. In other embodiments, the image surface 153 of the laminate image layer 150 may not be in contact with any other layers.

In various embodiments, the laminate image layer is made from the UV ink described above. It is understood that any suitable method to apply a high definition image may be used.

The Clear Coating Layer

The clear coating layer may provide a higher degree of optical clarity and natural look. The clear coating layer may be a protective layer, a gloss, or a combination thereof. In addition, the application of the clear coating layer, on the multiple ink layers, may provide sufficient surface performance to meet current NEMA standards for HPL and LPL performance, in some embodiments. The coating layer thickness, in some embodiments, may range from 0.0003 inches to over 0.005 inches. In other embodiments, the coating layer may be any thickness.

Referring to FIG. 4, the clear coating layer 180 may be situated adjacent to the laminate image layer 150. The clear coating layer 180 may be cured 123 to the image surface 153 of the laminate image layer 150 by heat, pressure, or a combination thereof.

In various embodiments, the coating may use a UV coating, similar to the UV ink described above. In various embodiments, the coating material may include thermoplastic resins. It is understood that any suitable material may be used. In some embodiments, the UV coating may incorporate one or more added materials, such as minerals and additives, to provide a high degree of wear and scratch resistance. In various embodiments, the UV coating may have a stretch greater than 200%. In some embodiments, a stretch greater than 500% may be preferred.

Coating Layer Material

In some embodiments, the coating may be a UV curable thermosetting coating. In other embodiments, the coatings may be comprised of, but are not limited to: thermoset acrylic, urethanes, epoxies, fluoropolymers, polyesters, and other UV curable coatings, or combinations thereof. In various embodiments, a thermoplastic copolymer resin that is substantially formaldehyde-free may be used. Examples of suitable thermoplastic resins for use in the polymer coating include, but are not limited to: (ABS), (PMMA), (COC), (EVA), (EVOH), (PTFE, alongside with FEP, PFA, CTFE, ECTFE, ETFE), (PTFE, alongside with FEP, PFA, CTFE, ECTFE, ETFE), (POM or Acetal), (Acrylic), (PAN or Acrylonitrile), (PA or Nylon), (PAI), (PAEK or Ketone), (PBD), (PB), (PBT), (PCL), (PCTFE), (PET), Polycyclohexylene dimethylene terephthalate (PCT), (PC), (PHAs), (PK), (PE), (PEEK), (PEKK), (PEI), (PES), Chlorinated Polyethylene (CPE), (PI), (PLA), (PMP), (PPO), (PPS), (PPA), (PP), (PS), (PSU), (PTT), (PU), (PVA), (PVC), (PVDC), (SAN), or Polysiloxanes.

Mineral Loading and Additives

In addition, a lower viscosity UV curable coating comprising a high level of mineral loading may be used, in some embodiments. In some embodiments, a mineral load may range from approximately 0.5% to 40%, carrying a much higher loading ability than conventional HPLs, which may be about 3%. In other embodiments, the mineral load may be below 0.5% or above 40%. In one embodiment, the preferred mineral may be quartz due to its reasonable UV transparency that assists during the UV curing of the coating. The minerals in various embodiments, may include, but are not limited to, alumina oxide, quartz, silica, ceramic particles or other suitable wear resistant minerals. In other embodiments, additional particles can be used. It should be understood that any viscosity coating may be used.

In some embodiments, abrasive particles (i.e. aluminum oxide) may be incorporated into the papermaking process or into one or more polymer coatings. This may result in further enhancing the surface wear properties, including but not limited to, abrasion, scratch, and mar resistance of the laminate. In a preferred embodiment, a polymer coating resin composition comprising aluminum oxide may be prepared by mixing, with continual agitation, the alumina powder into the solution to evenly disperse the alumina particles. A thickening agent (for example, sodium alginate, carbocymethyl cellulose, or other suitable agents) may be incorporated into the resin solution to aid with suspension of the alumina dispersion. In various embodiments, the abrasive particles may range in size from about 0.5 to 50 microns in diameter. In some embodiments, the particles may range in size from three to about twenty-five microns in diameter. In other embodiments, the particles may be smaller than 0.5 microns or larger than 50 microns. In various embodiments, deposition concentrations on or in the decorative paper may range from about one-half to five grams per square meter. In other embodiments, the concentrations may be less than one-half, or greater than five, grams per square meter.

In addition, the coating may include various additives including, but not limited to: antimicrobial, anti-graffiti, anti-slip, gloss aids, flattening agents, fillers, decorative inclusions, and any other suitable or desirable additive.

In one embodiment, the coating includes a natural mineral and resin combination that may be sufficient as to meet or exceed NEMA standards for high pressure laminates. In various embodiments, the coating thickness and mineral loading may be sufficient to pass NEMA LD3 Taber Wear Resistance Tests (NTWRT). In various embodiment sufficient to pass the NTWRT, the coating layer may be between 0.0005 inches in thickness to over 0.005 inches based on the quality required and the level of mineral loading.

Gloss

In some embodiments, a gloss may be an important part of the decorative laminate. A gloss may highlight the various texture levels. For example, embodiments of the present disclosure may have textures ranging in height from about 0.002 inches to over 0.25 inches. In other embodiments, the texture height range may be more or less. In some embodiments, an effect may develop after coating with a gloss, wherein thicker build areas may have a higher gloss level than thinner build areas. The effect may provide a gloss texture where the replicated natural material, or laminated image, may look more visual appealing and natural. For example, a laminate with a build layer consisting of eight build levels was produced and coated using a 90 degree high gloss coating. For the same gloss coating, the thickest build areas had a gloss reading of 90 degrees and the lowest single layer had a gloss reading of less than 80 degrees. By integrating multiple texture layers and multiple glosses, very unique laminate images may be produced that better replicate natural materials.

In a preferred embodiment, all ink layers may have the similar stretch. In at least one embodiment, the ink layer stretch may also be similar to that of the stretch in the substrate. Similar stretch may allow, when the laminate is bent, formed, or post-formed, the ink to stretch or bend equal to that of the substrate and other layers, thereby preventing cracks.

The Additive Texture Process

The Additive Texture Process (ATP) may use one or more materials that layer on one another in order to create a unique texture that matches one or more properties of a selected image. A particularly novel, and highly desired basis for the present disclosure, is the ability to overprint. Overprinting may perfectly align one or more layers, thereby perfectly matching one or more levels of texture as well as matching an image to the created texture. In some embodiments, overprinting may perfectly align multilayer UV ink layer textures on an HPL or formable thermoplastic laminate that may be used in HPL applications. Overprinting may also be used to apply a UV coating, in some embodiments. By overprinting the texture, the image, and the coating the present disclosure may provide a higher degree of resolution, contrast, vividness, and color accuracy. Overprinting may use any suitable material to achieve the desired texture and image alignment, in various embodiments.

The Additive Texture Process (ATP) may align and overprint a full color image to a specific texture. The ATP may convert a selected laminate image to a specific texture based on the image's coloring. The ATP may then construct one or more layers, wherein successive layers of material may be laid down in one or more shapes. In various embodiments, the layers may include, but are not limited to a build layer, the mask layer, and the lamination image layer.

Figure 5:
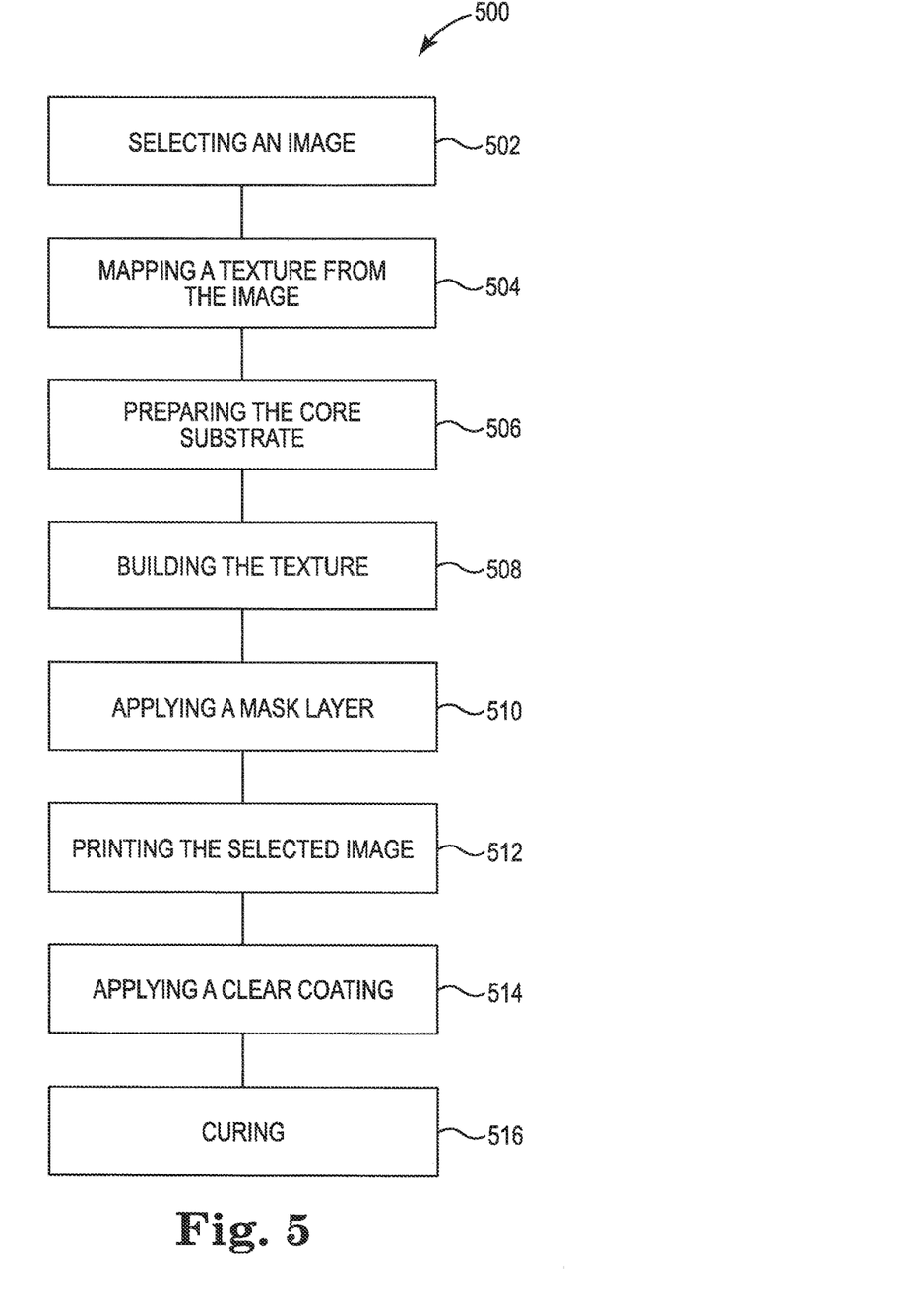
FIG. 5 is flow diagram of a method for making a multi-layer textured laminate.

Referring to FIG. 5, the ATP 500 may be comprised of one or more steps. In one embodiment, the steps may include, but are not limited to, selecting an image 502, mapping a texture from the image 504, preparing the core substrate 506, building the texture 508, applying a mask layer 510, printing the selected image 512, applying a clear coating 514, and curing 516.

Selecting an Image

In various embodiments, a color pattern, scan, or image may be selected for use in embodiments of the present disclosure. The image may typically be, but is not limited to, stone, wood, graphic designs, natural materials, or other images. A user may select any suitable image, herein called the laminate image. The laminate image may be scanned, be a computer generated image, or be chosen from any suitable source or database. The laminate image may be any size. The laminate image may be a non-repeating image, a repeating image, or any combination thereof. A duplicate of the laminate image may be saved as the laminate image layer file.

Mapping a Texture from the Image

Figure 3:
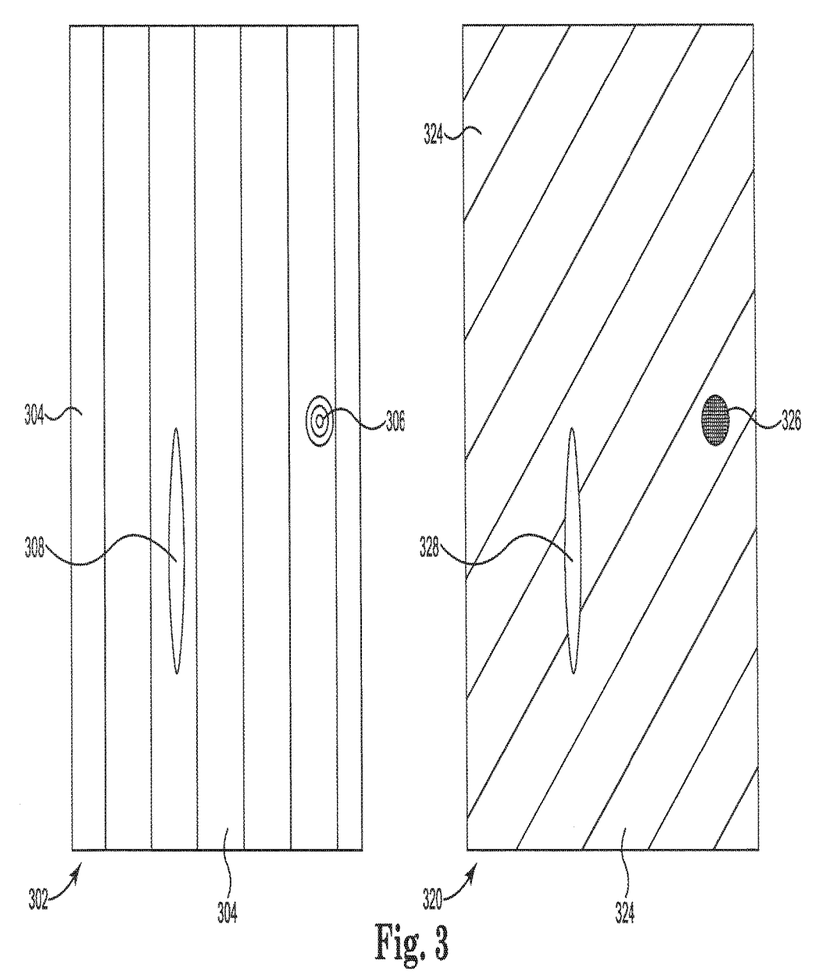
FIG. 3 is a sketch of a wood image in color, and the same wood image as it appears converted to a greyscale.

An image texturizing procedure may be used to assign, or map, a specific texture to an image. The image texturizing procedure may include the generation of one or more files, which may be used by a printer in the texture building procedure. A build image may be created based on the color properties of the laminate image. For example, a copy of the laminate image may be used or a copy may be converted to black and white, to greyscale, or to any suitable scale that may highlight one or more colors of the image. In an embodiment using black and white scaling, darker colors may turn black while lighter colors may turn white. In another embodiment using greyscale, the darkest colors may turn to black, the lightest colors may turn to white, and the remaining colors may turn one or more shades of grey. For example, as seen in FIG. 3, a laminate image 302 of wood paneling (brown) 304 with a wood knot (dark brown) 306 and an off-color imperfection (light brown) 308 may have been converted to greyscale, creating a build image 320. In the build image 320, the image may have a white area 328 where the imperfection was (to reflect the light color), a black area 326 where the wood knot was (to reflect the dark color), and grey area 324 everywhere else (to reflect the average color).

The color or shade may determine the thickness, or height, assigned to each build level. Areas of relief and areas of elevation may be automatically assigned to areas based on color, thereby creating registration between the colors of the image and a texture. In this way, a texture height may perfectly follow the contours of a color or object in an image. In an embodiment using a greyscale conversion, a build level over a black area 326 may be assigned a thick height. A build level over a white area 328 may be assigned a height that is relatively thin or substantially absent. A build level over a grey area 324 may be assigned one or more different heights, based on the shade of grey. Build levels over a grey area may be less (i.e. thinner) than build levels over black areas but greater (i.e. thicker) than build levels over white areas. The areas where build may occur, are herein referred to generally as build areas. In some embodiments, the more pronounced the difference in colors in an image are, the more pronounced the texture may be. For example, in a black and white image, the white areas may be depressions or reliefs and the black areas may be abruptly elevated areas. There may be no gradual build. In still another embodiment, other colors may be used without scaling, each color having a resulting build areas being unique in height. For example, in a green granite image containing green, black, and white colors, the build level heights assigned over a green area may be the thickest, the build level heights over a white area may be slightly less thick, and the build level heights over the black area may be relatively thin, or substantially absent.

Assigning heights and gradients to the shades may result in a final texture that matches the original image where the texture varies vertically based on the color of the original image. In one embodiment, a build image may be converted to black and white to create sharper edge texture. In another embodiment, a build image may be converted to a greyscale to create a gradient, resulting in smooth texture edges. In still other embodiments, a build image may incorporate both scales to obtain the desired effect. In various embodiment, a color in the build image may be assigned a percent ink coverage, which may register a height in the corresponding build level. That is, a color, such as black, may be assigned 100% ink coverage, resulting in each build level having a thickness of about 0.001 inches, in some embodiments. Another color, such as grey, may be assigned a reduced percent ink coverage, resulting in a build level having a thickness of less than 0.001 inches. The build level may be overprinted with one or more build levels to achieve any desired thickness. For example, a stone pattern that has both dark and light color areas may be converted to build levels wherein the dark stone colors may be assigned 100% ink coverage and the light color may have any value less than 100%, such as 0%. If the build layer was printed with ten passes, this would result in the black dark areas having a thickness of 0.01 inches and the light color areas having no thickness. In one embodiment using a stone image, the build areas may use a black and white scale for 5 build layers and a greyscale for the next 5 build layers resulting in assignment of another unique and dynamic texture.

The build image colors, as well as the corresponding build layer heights assigned to each color, may be stored as a build image file.

Preparing the Core Substrate

In some embodiments, a core substrate may require surface treatment to allow for ink adhesion. High pressure laminates are typically designed for high stain resistance making ink adhesion to such surfaces difficult. In various embodiments, a coating may be applied onto the surface of the substrate to provide a high degree of adhesion (ink adhesion) for the three dimensional printed layers. The coating, in some embodiments, may comprise a tie coating, an adhesion promoter coating comprising a water based urethane, or any other suitable adhesion promoter coating. The coating may be applied by one or more methods, including but not limited to, spray coating or roll coating. Surface treatments to improve ink adhesion may also include, but are not limited to: flame treatment, corona treatment, UV coating treatment, sandblasting, or sanding. Any suitable method to treat a core surface may be used. Other printable core substrates may or may not include an additional pre surface treatment based on their surface energy. The pre surface treatment may increase surface energy, thus improving the adhesion of an applied ink layer. In various embodiments, a core with a surface energy over 35 dynes may allow for appropriate adhesion of the MTP layer to the core substrate. In other embodiments, any surface energy may be sufficient.

Building the Texture

A texture building procedure may create, or build, the build layer based on the build level heights assigned in the image texturizing procedure. The build image file may be sent to a wide format UV printer. In one embodiment, a core substrate sheet, may be placed into a UV sheet fed printer.

Some printers may overprint, allowing each layer to be printed as the sheet advances, which may allow for substantially perfect alignment. Other printers, such as a standard flatbed UV cure printer, may print one layer at a time, requiring the sheet to be reloaded and reprinted for each subsequent layer, allowing for near perfect alignment. However, it will be understood that any suitable printer may be used, and herein referred to as printer. It is also understood that any degree or alignment may be sufficient.

In various embodiments, UV ink may be used to create one or more layers. New UV cured high stretch inks, such as those from Polymeric Imaging Inc., now provide for a single layer digital UV cured ink that has sufficient stretch for vacuum forming. Multiple passes of either a UV ink or a UV clear coating typically requires that the previous layer is sanded or surface treated so that the new UV ink or coating layer may adhere to the previously fully cured layer. These new flexible UV cured inks now have the ability to provide sufficient interlayer adhesion for creating build through multiple layers. That is, the previous layer may not require sanding or surface treatment in order for the next layer to adhere.

In some embodiments, the printer may be set to a relatively low UV energy level so that the ink may partially cure, or still remain soft. A soft or partially cured ink may allow for good adhesion between the build layers. In some embodiments, the UV energy levels may range from about 50 to about 600 watts per linear inch. However, other appropriate energy levels may be used.

In one embodiment, black UV ink may be used to construct the build levels. Black UV ink may be printed on build areas, as determined in the build image file. In one embodiment, where the laminate image was converted to greyscale, the black UV ink may be printed onto all the black and grey build areas. The black build areas may be printed with the most ink, resulting in the thickest area. The grey build areas may be printed with varying amounts of ink resulting in one or more levels of thickness. The thickness of the build areas may increase in direct correlation to the darkness of the grey in the area. Ink may not be printed onto areas that correspond to a white area of the image. In another embodiment, white UV ink may be used. In still another embodiment, a colored UV ink may be used. It is understood that while UV ink may be preferred, any material may be used to construct the build levels.

In an example using black UV ink, areas where there are build may be black while areas where there is no build may be white. In another embodiment, build levels may be created with white ink. In an example using white ink, the finished texture may be substantially white. Any suitable material to construct one or more build levels may be used.

One or more build levels may be printed, resulting in a completed build layer. The build levels may be cured with heat, pressure, or a combination thereof before the application of the next layer, in some embodiments. In other embodiments, the build levels may not be cured before the application of the next layer.

Applying a Mask Layer

A mask creation procedure may print, create, or lay a mask layer (also referred to as flood layer). In one embodiment, a mask layer may be printed onto the build layer. A mask layer may be selected, comprising a desired color or pattern, in some embodiments. In other embodiments, a mask layer may be automatic, or preselected. A mask layer file, with the mask layer chosen to be printed, may be sent to the printer. The printer may apply a mask layer, or flood, to the completed build layer. In other embodiments, the sheet may be removed from the printer and a mask layer may be applied by any suitable method. For example, a white flood coat may be applied using a white paint that adheres to the build layer.

In some embodiments, the build layer may be constructed from the preferred color for the mask layer, resulting in no mask layer being applied. For example, a solid white layer may be present in an embodiment using UV cured white ink in the texture building procedure.

Printing the Selected Image

The laminate image layer file may be sent to the printer. All printable files may be created in advance and sent to the printer individually, as a single consolidated file, or as any combination thereof. In a preferred embodiment, application of the laminate image layer may directly align the selected image, in full color, over the build layers, based on the original computer image, or laminate image. In another embodiment, the laminate image layer may be printed onto the mask layer, so that it aligns with the textured build layer. The laminate image, printed on the build and/or mask layer, may now have a fabricated texture that realistically aligns with the image texture, thereby creating a finished multi-layer texture print (MTP).

Applying a Clear Coating

In one or more embodiments, the clear coating layer may be a dual cure, where UV is used for the first cure (prior to laminating or forming) and the heat from forming is used for the second cure, further crosslinking the clear coating to impart additional performance and hardness.

In some embodiments, with texture heights over 0.025 inches a high gloss UV coating may be sprayed, rolled, curtain coated or applied by meyer bar methods onto the textured laminate print. In other embodiments, with a texture height less than 0.025 inches, a low durameter roll coater using a UV curable resin may be used for a high gloss coating. In other embodiments, a non-UV cured coating may be used. In some embodiments, other high performance coatings sufficient for horizontal and/or vertical grade laminate specification and application may be used. It is understood that any suitable method to gloss may be used. It is further understood that any degree of gloss may be used. In various embodiments the coating may be cured by one or more methods, including but not limited to, using LED, UV light, or E-Beam curing systems and methods.

Curing

All layers may be fused or cured together by temperature, pressure, any other suitable method, or any combination thereof. In some embodiments, each layer may be cured to the previously laid layer before the application of the next layer. In other embodiments, the curing may not occur until all layers have been constructed. It is understood that any suitable method may be used to cure.

Other Example Embodiments

One skilled in the art may recognize the opportunities presented with the additive texture process in building multi-layer textured prints extend far beyond the production of laminate surfaces.

A multi-layer high definition image may be constructed on any number of products. On a large scale, a house siding may be constructed to look like a traditional building material, like bricks. The siding may use the MTP to build a texture matching the image where the parts the image representing grout may be thinner than the parts of the image representing bricks. The bricks may still have subtle variations in texture height based on the coloring of the brick in the image.

In one embodiment, a household wood cleaner may be in a container. The container may be constructed with the MTP using a wood image, similarly to the process described above. The textured build layer and substantially perfectly aligned image may give the container material a look, and corresponding texture, of wood.

In another embodiment, the MTP may be used to construct a book cover. A book on geology, for example, may be printed to reflect a stone image. The MTP may align a texture matching the stone image with the image, giving the book a look and feel of being bound by a stone cover.

The MTP may also be used to create artificial materials, that may be used in garment construction, such as leather or alligator skin. A sheet of material may be created using the MTP to reflect alligator skin. The MTP may assign build levels that slowly build height in one direction before suddenly dropping to a thinner build height, resulting in a look and feel of the scales in the alligator skin. The alligator skin image may be perfectly aligned on top of the build layer.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

We claim:

1. A multi-layer laminate, comprising:
   a substrate;
   a printed build layer defining a texture having elevated areas and areas of relief;
   a printed image layer; and
   a coating layer having a mineral loading.

2. The laminate of claim 1, wherein the printed image layer comprises a color pattern in registered relation to the elevated areas and areas of relief.

3. The laminate of claim 1, wherein the mineral loading is aluminum oxide.

4. The laminate of claim 1, wherein the printed build layer comprises an ultra-violate curable ink.

5. The laminate of claim 1, wherein the printed image layer comprises an ultra-violet curable ink.

* * * * *